No. 813,717. PATENTED FEB. 27, 1906.
R. D. KLINE.
PLANT EXCAVATOR.
APPLICATION FILED SEPT. 21, 1905.

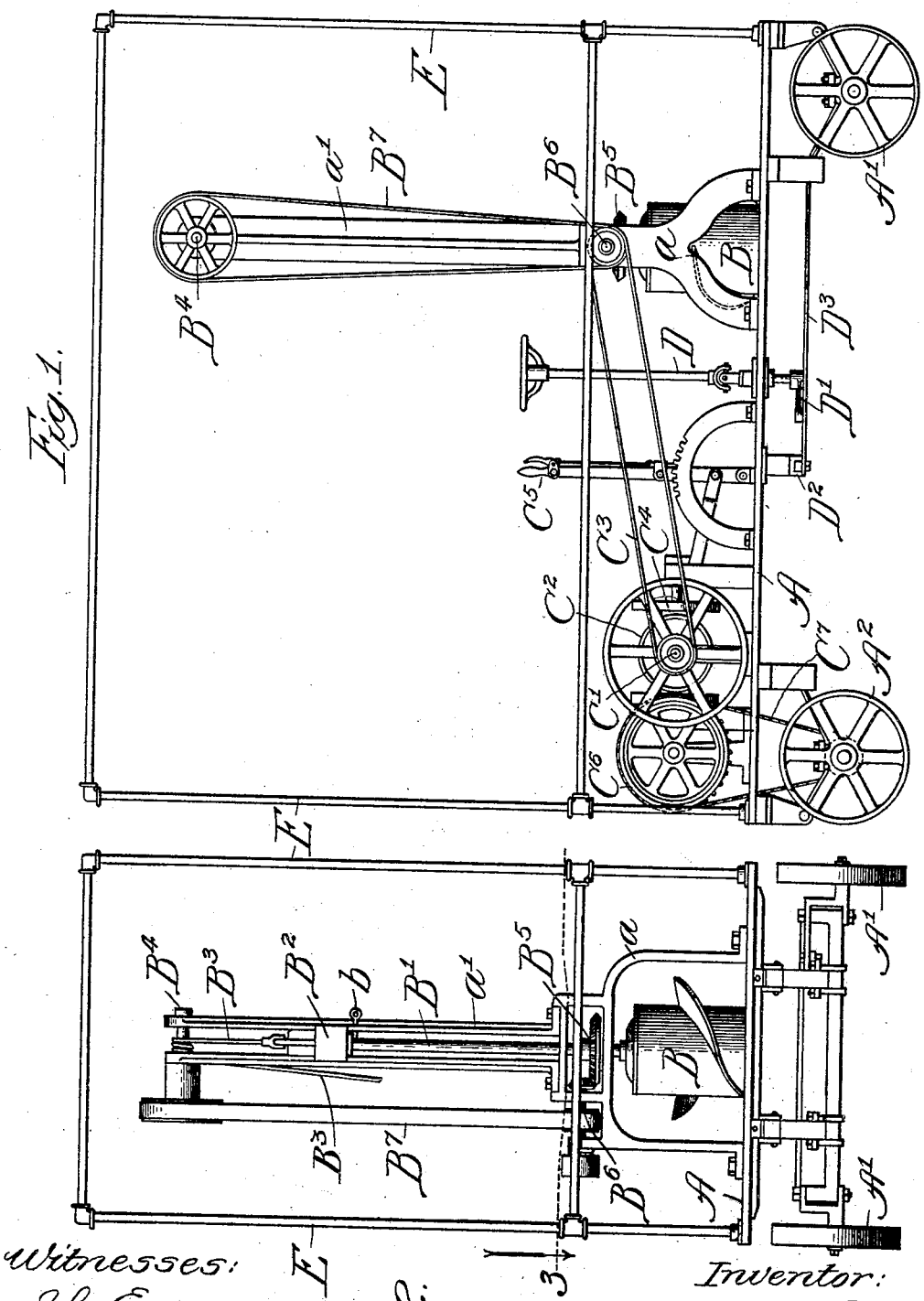

2 SHEETS—SHEET 2.

Witnesses:
John Enders
Chas H Buell

Inventor:
Rudolph D. Kline,
By Dyrenforth, Dyrenforth and Lee
Attys.

UNITED STATES PATENT OFFICE.

RUDOLPH D. KLINE, OF STREATOR, ILLINOIS.

PLANT-EXCAVATOR.

No. 813,717.                     Specification of Letters Patent.                    Patented Feb. 27, 1906.

Application filed September 21, 1905. Serial No. 279,402.

*To all whom it may concern:*

Be it known that I, RUDOLPH D. KLINE, a citizen of the United States, residing at Streator, in the county of Cook and State of Illinois, have invented a new and useful Improvement in Plant-Excavators, of which the following is a specification.

My invention relates particularly to plant-excavating machines; and my primary object is to provide a power propelled and operated machine adapted to rapidly perform the work of boring annular holes in the earth, leaving the cores of earth and the plants therein to be taken out by a suitable extracting implement.

As is now well understood in the art of transplanting, plants should be lifted with the soil about them after the ground has frozen and packed and preserved in earth until planting time. My improved machine enables the boring described in my Patent No. 781,346, granted January 31, 1905, to be done very rapidly and inexpensively, regardless of the condition of hardness of the ground. The boring-machine is followed by workmen provided with extractors, such as that described in my application No. 279,403 of even date herewith, and these workmen lift the plants and earth bodies containing them and put them in store-rooms provided for the purpose.

The invention is illustrated in the accompanying drawings, in which—

Figure 3:
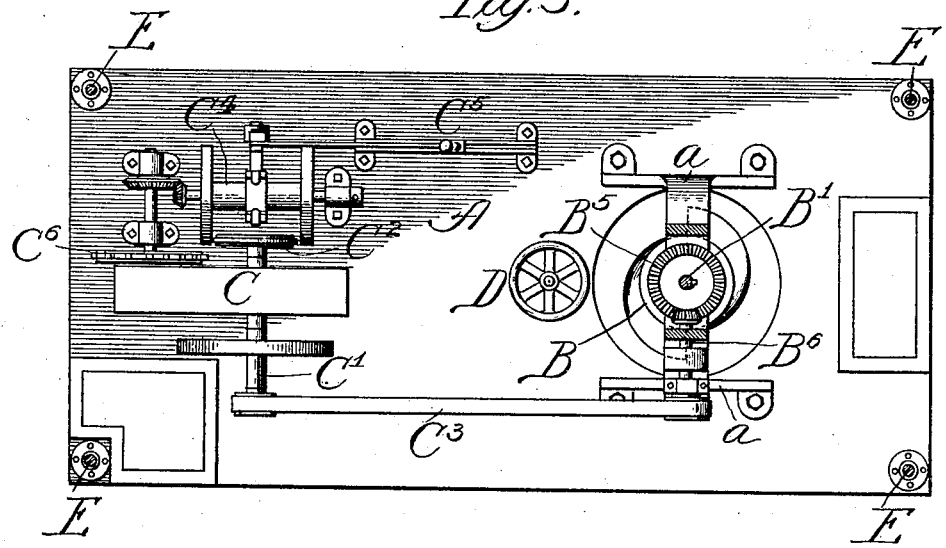
Figure 4:
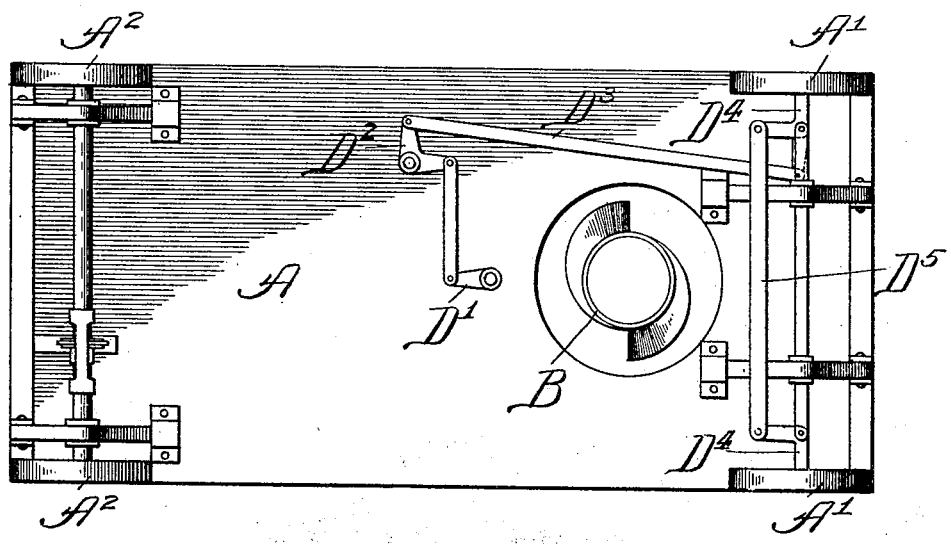

Figure 1 represents a side elevational view of the machine; Fig. 2, a front elevational view of the same; Fig. 3, a plan section taken as indicated at line 3 of Fig. 2, and Fig. 4 a bottom plan view of the machine.

In the preferred construction, A represents a platform supported on front and rear wheels $A'$ $A^2$, respectively; B, a tubular boring tool or auger, such as is described in my above-mentioned patent; $B'$, a shaft journaled in a standard $a$, located near the front end of the platform and suspended from a bearing $B^2$, supported by a cable $B^3$; $B^4$, a continuously-driven shaft journaled in the upper end of an extension $a'$ of the standard $a$; $B^5$, a bevel-gear with which the shaft $B'$ has splined connection and through which the shaft is freely movable vertically; $B^6$, a horizontal transverse shaft joined by a belt $B^7$ to the shaft $B^4$ and equipped with a bevel-pinion meshing with the gear $B^5$; C, an engine having a transverse shaft $C'$, equipped at one end with a friction-wheel $C^2$ and at the other end with a pulley connected by a belt $C^3$ with the shaft $B^6$; $C^4$, transmission-gear mechanism controlled by a lever $C^5$ and equipped with a sprocket-wheel $C^6$, joined by a chain $C^7$ to a drive-wheel of the vehicle, the transmission-gear mechanism being adapted to transmit power from the shaft $C^2$ in either a forward or reverse direction to the drive-wheel of the machine; D, a steering-shaft equipped at its lower end with a crank $D'$, connected with a bell-crank lever $D^2$, pivotally supported beneath the platform A and joined by a link $D^3$ to an arm connected with one of the bell-cranks $D^4$, carrying the spindles for the front wheels of the vehicle, said bell-cranks being connected by a link $D^5$ in the usual manner, and E a tubular frame supported on the platform and adapted to receive a covering for the vehicle.

As shown, the engine preferably is located near the rear end of the platform, and the auger is supported near the front end of the machine with the shaft $B^6$ parallel with the engine-shaft. The lever $C^5$ is preferably located in front of and to the left of the engine, while the steering device D is located just in the rear of the standard $a$. A stool (not shown) may be located in front of the engine and in the rear of the steering-wheel for the use of the operator.

The operation will be readily understood. The machine may be propelled in either direction by shifting the lever $C^5$ at will, and the machine is steered in the usual manner. The engine may run without propelling the vehicle, and when it is running the shafts $B^4$ and $B^6$ are continuously rotated. The standard extension $a'$ affords guides for the shaft-bearing $B^2$, as best shown in Fig. 2, and a removable pin $b$ is connected with the guide, this pin being capable of being projected beneath the shaft-bearing $B^2$ to lock the auger in the elevated position. The machine may be driven astride a row of plants and stopped at will to enable the auger to be lowered and perform the boring operation. When it is desired to raise the auger, this may be accomplished by the operator holding the free end of the cable $B^3$, thereby causing the cable to wind upon the shaft $B^4$.

The machine herein described enables the operation of gathering plants for transplanting purposes to be very quickly performed, and, so far as I am aware, no power propelled and operated machine has ever heretofore been devised for the purpose. The machine is of simple construction and comparatively inexpensive.

Changes in details of construction within the spirit of my invention are contemplated. Hence no undue limitation should be understood from the foregoing detailed description.

What I regard as new, and desire to secure by Letters Patent, is—

1. In a machine of the character set forth, the combination of a vehicle, an engine thereon, a standard, an auger having a vertically-movable shaft journaled in said standard, a transverse shaft geared to said auger-shaft, an extension of said standard, a transverse shaft journaled in the upper portion thereof; transmission means between the engine and transverse shafts, a bearing for the upper end of the auger-shaft, and a cable supporting said bearing and the auger depending therefrom and passing about said second-named transverse shaft, said cable having a free end adapted to be grasped by the operator, thereby to cause the upper transverse shaft to elevate the auger.

2. The combination of a platform equipped with wheels and guiding means, an engine supported at the rear end of the platform, a standard supported on the front end of the platform, a vertically-movable auger having a shaft journaled in said standard, a transverse shaft geared to the auger-shaft and connected with the engine, a higher transverse shaft connected with the first-named transverse shaft, and auger-elevating means connecting the auger-shaft and the second-named transverse shaft.

3. The combination of a platform equipped with wheels and guiding means, an engine supported at the rear end of the platform, a standard supported on the front end of the platform, a vertically-movable auger having a shaft journaled in said standard, a transverse shaft geared to the auger-shaft and connected with the engine, a standard extension provided with a guide, a bearing supporting the auger-shaft and movable in said guide, a second transverse shaft journaled in the upper end of the standard extension and belted to the first-named transverse shaft, and a cable supporting said bearing and having a free end passed about the upper transverse shaft, for the purpose set forth.

RUDOLPH D. KLINE.

In presence of—
A. U. THORIEN.
J. H. LANDES.